June 17, 1930. C. A. PERSONS 1,763,817
SADDLE FOR MOTOR CYCLES AND THE LIKE
Filed Dec. 31, 1928   2 Sheets-Sheet 2

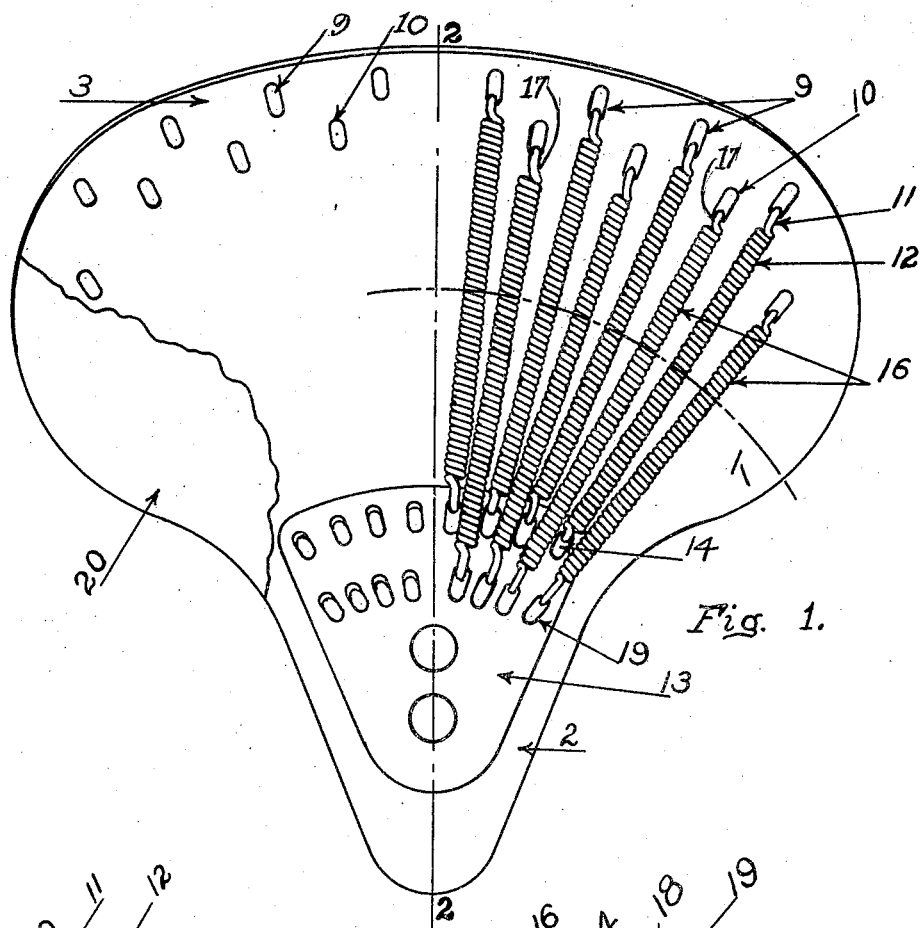
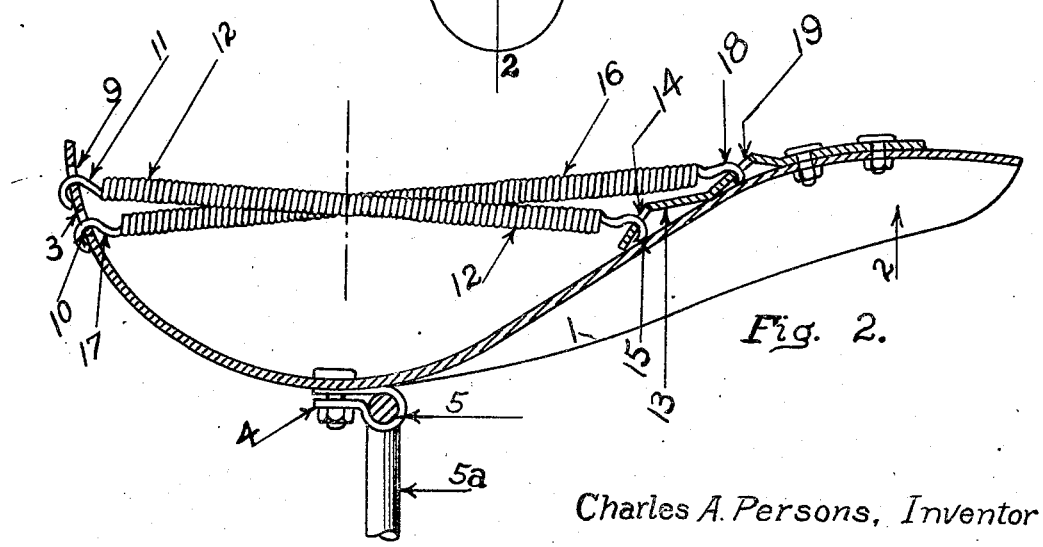

Charles A. Persons, Inventor
by Owen W. Kennedy
Attorney

Patented June 17, 1930

1,763,817

UNITED STATES PATENT OFFICE

CHARLES A. PERSONS, OF WORCESTER, MASSACHUSETTS, ASSIGNOR TO PERSONS-MAJESTIC MANUFACTURING COMPANY, OF WORCESTER, MASSACHUSETTS, A CORPORATION OF MASSACHUSETTS

SADDLE FOR MOTOR CYCLES AND THE LIKE

Application filed December 31, 1928. Serial No. 329,349.

My invention relates to the construction of a saddle that is particularly adapted for use with motorcycles, or other like vehicles, and has for its object to provide a saddle that will afford to the rider of the vehicle a maximum degree of comfort, and safety from possible injury from road shocks.

In the ordinary construction of motorcycle saddles a shaped pressed metal seat is employed which is covered with padded leather, the rear of the metal seat being usually supported by heavy springs attached to the frame of the machine. Inasmuch as these seat supporting springs must possess sufficient strength to hold the saddle off the frame, a considerable portion of the road shocks are transmitted to the metal seat and from thence to the rider, since the padding under the leather is incapable of absorbing all of the shocks transmitted to the rigid metal seat, on which the weight of the rider is borne directly.

According to my invention, I provide an improved saddle construction which differs radically from saddle constructions heretofore employed by reason of the fact that the weight of the rider is borne directly on a series of resilient members interposed between the rider and the concave metal seat which is attached to the frame of the vehicle. With my improved saddle it is practically impossible for any road shocks, coming to the rigid metal seat, to be transmitted to the rider, since all such road shocks will be absorbed by the resilient members which actually support the weight of the rider. The above and other advantageous features of my invention will hereinafter more fully appear, reference being had to the accompanying drawings in which—

Fig. 1 is a plan view of a saddle embodying my invention, with the cover partially removed.

Fig. 2 is a vertical sectional view along the line 2—2 of Fig. 1.

Like reference characters refer to like parts in the different figures.

Figure 3:
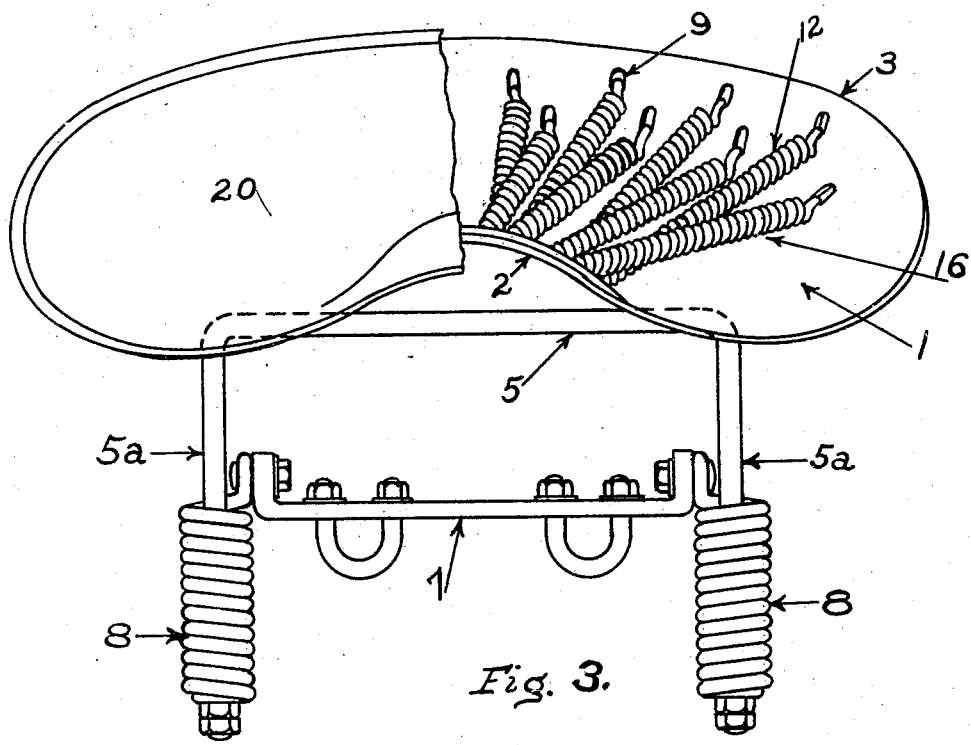
Fig. 3 is a front view of the saddle shown in Fig. 1.
Figure 4:
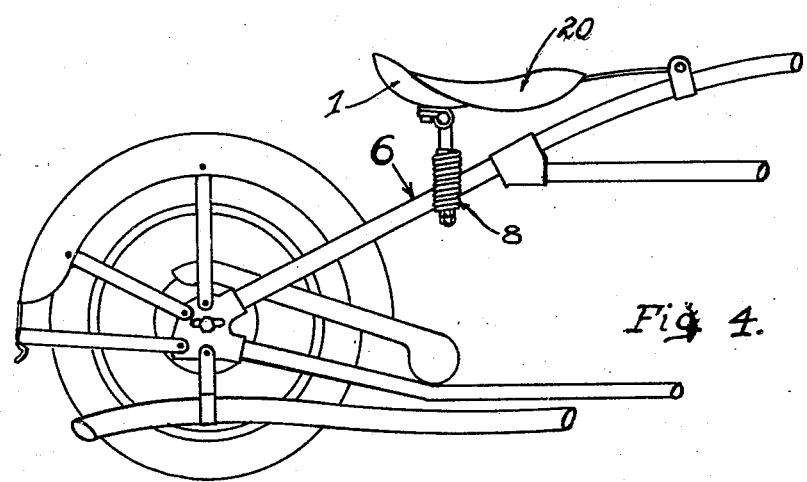
Fig. 4 is a view in side elevation showing the saddle attached to the frame of a motor-cycle.

Referring first to Figs. 1 and 2, the saddle consists of a concave seat 1 preferably made of sheet metal pressed to provide a pommel portion 2 shaped to fit between the legs of the user, from which pommel portion 2 the seat flares outwardly and downwardly to terminate in a rounded flange portion 3 which is of substantially the same height as the front of the pommel portion 2. The bottom of the seat 1 has clips 4 secured thereto in which is received the horizontal portion of a U-shaped yoke 5, the legs $5^a$ of which extend downwardly and are supported by the frame 6 of a motorcycle as shown in Figs. 3 and 4. One way of supporting the yoke 5 from the frame 6 is by means of a bracket 7 carried by the frame 6 with springs 8 interposed between the arms of the bracket 7 and the legs $5^a$ of the yoke 5. It is to be understood however that other means may be employed for supporting my improved saddle, the essential feature of which resides in providing a resilient support between the metal seat 1 and the body of the rider, as will now be described.

Referring again to Figs. 1 and 2, the rear flange 3 of the seat 1 provides a series of openings 9 and 10 that are different distances from the point of the pommel 2 and are staggered with respect to each other. The outer series of openings 9 receive the bent over ends 11 of a series of closely coiled springs 12 which converge inwardly and downwardly from the flange 3 upon the pommel 2. The pommel 2 presents a projecting portion 13, which may be secured thereto or formed integrally therewith, and provides a series of spaced openings 14 for receiving the turned over ends 15 of the springs 12. Thus there is provided a fan shaped arrangement of springs 12 extending at a small angle from the horizontal between the upper edge of the flange 3 and the lower portion of the pommel projection 13 as clearly shown in Fig. 2.

A second series of springs 16 similar to the springs 12 provide hooked-over ends 17 received in the lower series of openings 10, these springs 16 extending upwardly towards the pommel projection 13 where the hooked-over ends 18 are received in a series of openings 19. The openings 19 are staggered with respect to the openings 14 of the pommel projection 13, just as the openings 9 are staggered with respect to the openings 10, so that the two series of springs 12 and 16 extend between the pommel 2 and the rear flange 3 without substantial interference with each other, as is evident from Fig. 1.

It will be noted however in Fig. 2 that the two series of springs 12 and 16 cross each other around a zone which is centrally disposed with respect to the surrounding flange 3, as indicated by the dot and dash line, in which zone the weight of the rider may be considered as being concentrated. Therefore, the weight of the rider is borne almost entirely by the two series of springs 12 and 16 and due to the strength and multiplicity of these springs 12 and 16 the body of the rider rarely, if ever, touches the metal seat beneath the springs. As a matter of fact the springs 12 and 16 arrange themselves to the form of the rider so that road shocks coming from the frame 6 of the vehicle through to the metal seat 1 are absorbed by the springs 12 and 16, without the rider being aware of any appreciable shock. When the rider dismounts from the seat, the springs 12 and 16 return to their original form.

In order to protect the rider from the end hooks of the springs and to prevent undue wear of the clothing of the rider, the entire seat 1 is enclosed in a cover 20 preferably composed of leather which is flexible enough to conform itself to the yielding of the springs 12 and 16 under the weight of a rider. This cover 20 is shown as being partially broken away in Figs. 1 and 3 in order to clearly show the arrangement of the springs, while in Fig. 2 the cover 20 is entirely removed. Obviously any suitable material may be employed for the cover 20 which is merely for the purpose of enclosing the springs and protecting the clothing of the rider.

From the foregoing then it is apparent that by my invention I have provided an improved saddle construction that is particularly adapted for use with motorcycles and other light vehicles. With my improved saddle it is practically impossible for road shocks received by the frame of the vehicle to be transmitted to the rider, for even should such road shocks reach the metal seat 1, the two series of intercrossing springs 12 and 16 completely absorb such shocks without the rider being aware of them.

I claim:

1. In a saddle, a rigid concave seat providing a pommel and a flange flaring outwardly from said pommel and a series of resilient members extending between said pommel and said flange for yieldingly supporting the rider out of engagement with the concave portion of said seat between said pommel and said flange.

2. In a saddle, a rigid concave seat and a plurality of resilient members extending across the concave portion of said seat, said resilient members being alternately arranged with the ends of each member attached to said seat at different levels, with respect to the ends of adjacent members, whereby said resilient members cross each other between their points of attachment to said seat.

3. In a saddle, a rigid seat providing a pommel and a concave portion diverging from said pommel and bounded by a flange, and two series of resilient members extending between said pommel and said flange with their ends secured to said pommel and flange at different levels, whereby said resilient members cross each other above the concave portion of said seat.

4. In a saddle, a rigid seat providing a pommel and a concave portion diverging from said pommel and bounded by a flange, and two series of resilient members extending between said pommel and said flange with their ends secured to said pommel and flange at different levels, whereby said resilient members cross each other above the concave portion of said seat to yieldingly support the weight of the rider out of engagement with the concave portion of said seat.

CHARLES A. PERSONS.